United States Patent
Theriault

[19]

[11] Patent Number: 6,121,899
[45] Date of Patent: Sep. 19, 2000

[54] IMPENDING AIRCRAFT TAIL STRIKE WARNING DISPLAY SYMBOLOGY

[75] Inventor: Ricky J. Theriault, Beaverton, Oreg.

[73] Assignee: Rockwell Collins, Inc., Cedar Rapids, Iowa

[21] Appl. No.: 09/293,285

[22] Filed: Apr. 16, 1999

[51] Int. Cl.[7] .................................................. G08B 23/00
[52] U.S. Cl. ........................ 340/967; 340/946; 340/970; 340/980; 701/11
[58] Field of Search .................................. 340/946, 959, 340/963, 967, 970, 973, 974, 975, 980; 701/4, 14, 15, 16, 11; 73/178 T; 244/1 R, 180, 181

[56] References Cited

U.S. PATENT DOCUMENTS

| | | | |
|---|---|---|---|
| 4,278,142 | 7/1981 | Kono | 180/168 |
| 4,695,013 | 9/1987 | Trampnau | 340/946 |
| 4,769,645 | 9/1988 | Paterson | 340/946 |
| 5,047,942 | 9/1991 | Middleton et al. | 701/16 |
| 5,115,398 | 5/1992 | De Jong | 701/200 |
| 5,250,947 | 10/1993 | Worden et al. | 340/973 |
| 5,442,349 | 8/1995 | Inoue et al. | 340/995 |
| 5,710,668 | 1/1998 | Gohman et al. | 359/634 |
| 5,901,927 | 5/1999 | Ho | 340/963 |
| 5,978,715 | 11/1999 | Briffe et al. | 701/11 |

*Primary Examiner*—Daniel J. Wu
*Assistant Examiner*—Van T. Trieu
*Attorney, Agent, or Firm*—Nathan O. Jensen; Kyle Eppele; J. P. O'Shaughnessy

[57] ABSTRACT

Aircraft tail strike protection is provided by displaying to a pilot tail strike warning symbols during takeoff and approach to landing. In a takeoff scenario, a pitch margin indicator symbol referenced to a boresight symbol provides a pilot with anticipatory information and an awareness of the pitch attitude margin before a tail strike incident. In an approach to landing scenario, a TAILSTRIKE warning annunciation is referenced to a flight path symbol and alerts the pilot of an impending tail strike incident. The symbols displayed during either scenario center on the pilot area of focus for each task. They give the pilot an awareness of an impending tail strike incident and necessary reaction time to avoid it.

14 Claims, 7 Drawing Sheets

IMPENDING AIRCRAFT TAIL STRIKE WARNING DISPLAY SYMBOLOGY

TECHNICAL FIELD

The present invention relates to the visual display of aircraft flight information for observation by a pilot and, in particular, to the production and display of aircraft tail strike warning symbology for alerting the pilot to a possible impending incident in which the tail of the aircraft is about to strike the ground during takeoff or approach to landing.

BACKGROUND OF THE INVENTION

Head-up display (HUD) systems are currently used in aircraft to provide pilots with essential information superimposed onto their forward field of view through the aircraft windshield. The information displayed is typically data or symbolic images indicative of flight conditions, such as the operating condition of the aircraft, environmental information, or guidance information. HUD systems are also being designed for use in automobiles and other vehicles.

In one type of aircraft HUD system, a light source emits a colored image carried by multiple wavelengths of light in response to signals generated by an image signal controller. The light rays carrying the colored image propagate through a relay lens to create an intermediate image. A wavelength selective combiner reflects the intermediate image toward a pilot, who views the image as it is superimposed on an outside world scene in the same field of view. The combiner is constructed to have multiple optical powers that correct for longitudinal color aberrations introduced by monochromatic relay lens elements and thereby presents to the pilot a correctly focused multi-colored final virtual image at or near optical infinity. The design details of a multi-color HUD system are described in U.S. Pat. No. 5,710,668, which is assigned to the assignee of this patent application.

Guidance information displayed on a HUD combiner for observation by a pilot frequently includes symbology that represents position and attitude guidance for the aircraft during flight. One example is a flare anticipation cue implemented in a Flight Dynamics Head-Up Guidance System that is certified by the Federal Aviation Administration for use on Boeing 737-300 aircraft. The flare anticipation cue alerts the pilot several seconds before the aircraft reaches a flare initiation height and indicates to the pilot the pitch up rate required at the initial part of the flare. Another example is a turn anticipation cue that is described in copending International Patent Application No. PCT/US98/14177, which is assigned to the assignee of this application. The turn anticipation cue provides guidance information to a pilot during low visibility ground weather conditions after the aircraft has touched down so that the pilot can safely taxi the aircraft to the airport terminal.

There are several common factors contributing to the likelihood of aircraft tail strike that necessitate pilot awareness to tail strike during takeoff or approach to landing. With respect to takeoff, the most common contributing factor to aircraft tail strike incidents is an improperly set stabilizer in the trailing edge up direction. This is caused by pilot setting error or incorrect loading information and results in lighter than expected control forces during the rotation. If the stabilizer position is not checked, aircraft over-rotation can occur. A second factor is rotating the aircraft prior to achievement of actual $V_{ROT}$ speed, which is the speed at which the aircraft nose is rotated. A third factor is excessive pitch rate (approximately 5 degrees per second) during aircraft rotation caused by pilot setting errors or pilot exuberance. For large transport aircraft, nominal lift-off pitch attitude is, for example, approximately 8 degrees, with a recommended rotation rate at approximately 2.5 to 3 degrees per second. For fully compressed landing gear, nominal tail strike angles are about 12 to 13 degrees, depending upon aircraft height above the runway. A final factor contributing to aircraft tail strike during takeoff is early use of flight director or climb out pitch reference.

With respect to approach to landing, the most common contributing factor to aircraft tail strike incidents stems from the pilot's flying an unstabilized approach below 500 feet. A second contributing factor is the use of pitch trim during a flare maneuver, resulting in unexpectedly light control forces for flare initiation. A third factor is an increasing tail wind resulting in increased aircraft sink rate while already at low thrust settings. This condition further results in an attempt by a pilot to salvage a hard landing by executing a rapid pitch-up maneuver. A final factor contributing to aircraft tail strike during the landing phase is a late go-around procedure using the flight director pitch reference for desired pitch attitudes before aircraft acceleration.

It would be desirable, therefore, to provide for display guidance information that can warn a pilot of a possible impending incident in which the aircraft tail is about to strike the ground during takeoff or approach to landing.

SUMMARY OF THE INVENTION

An object of the invention is, therefore, to provide to a pilot visual warning of a possible impending aircraft tail strike against the ground during takeoff or approach to landing.

An advantage of the invention is that it can be implemented with the use of symbolic images displayed on a HUD system combiner.

The present invention is described by way of example with reference to aircraft head-up display systems and solves the problem of warning a pilot of a possible aircraft tail strike incident during takeoff or approach to landing. The present invention is the production of symbology for display as tail strike warning information on a HUD system combiner whenever a tail strike incident is imminent.

The display surface positioning and timing of appearance of tail strike symbology are derived from a tail strike warning calculation based on the aforementioned factors contributing to aircraft tail strike during takeoff or approach to landing. The tail strike warning calculation uses a nominal tail strike pitch attitude, $\theta_{TS}$, which is a function of aircraft wheel height and landing gear length, and overall aircraft length and rear end geometry.

In a first embodiment in which there is adequate available display surface area, the term $\theta_{TS}$ is differenced from an actual aircraft pitch attitude to produce an aircraft pitch margin signal that causes display of tail strike warning symbology whenever the pitch margin signal is below a specified threshold, preferably 3.0 degrees.

In a second embodiment, the term $\theta_{TS}$ is differenced with pitch rate compensation to provide aircraft pitch anticipation and actual aircraft pitch attitude information to produce an aircraft pitch rate enhanced error signal. The second embodiment is useful primarily when there is inadequate display surface area, or the aircraft is of a type that requires a relatively quick (e.g., 5 degrees per second) rotation or increased aircraft control anticipation. This signal causes display of tail strike warning symbology whenever the aircraft pitch margin is below a predetermined threshold, preferably 3.0 degrees, or the computed pitch rate exceeds a predetermined threshold, preferably 4.5 degrees per second.

The numerical threshold values stated in this patent application for pitch margin and computed pitch rate are specific to the Boeing 737-800 aircraft type. Skilled persons will appreciate that different aircraft types will dictate different threshold values.

Altitude bands for displaying symbology differ, depending on whether takeoff or approach to landing is being performed. For the takeoff case, tail strike warning symbology is displayed in the form of relative position between pitch margin limit and boresight reference symbols whenever the display criteria are satisfied during aircraft rotation. These symbols remain on display until the aircraft has reached a predetermined altitude, preferably about 3 meters. For the landing case, the tail strike symbology in the form of an annunciation is displayed whenever the display criteria are satisfied and the aircraft altitude is below a predetermined threshold, preferably about 30 meters.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1:
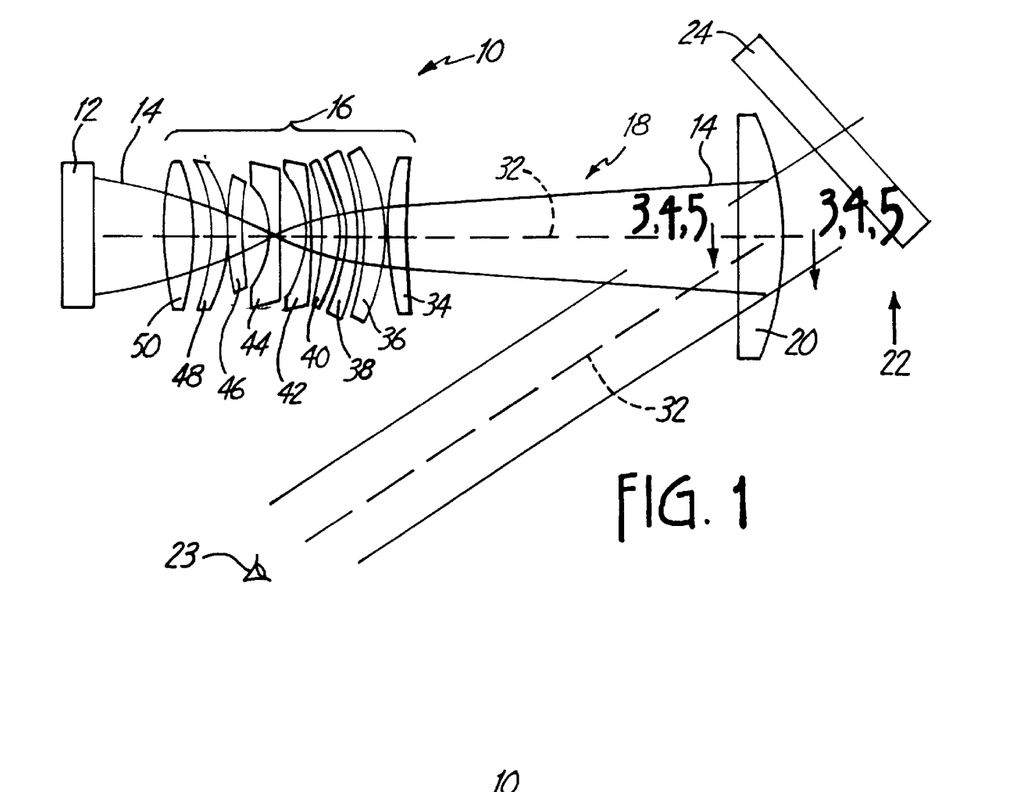
FIG. 1 is a diagram of an aircraft head-up display system that includes an optical combiner on which the aircraft tail strike warning symbology of the present invention is displayed.
Figure 2:
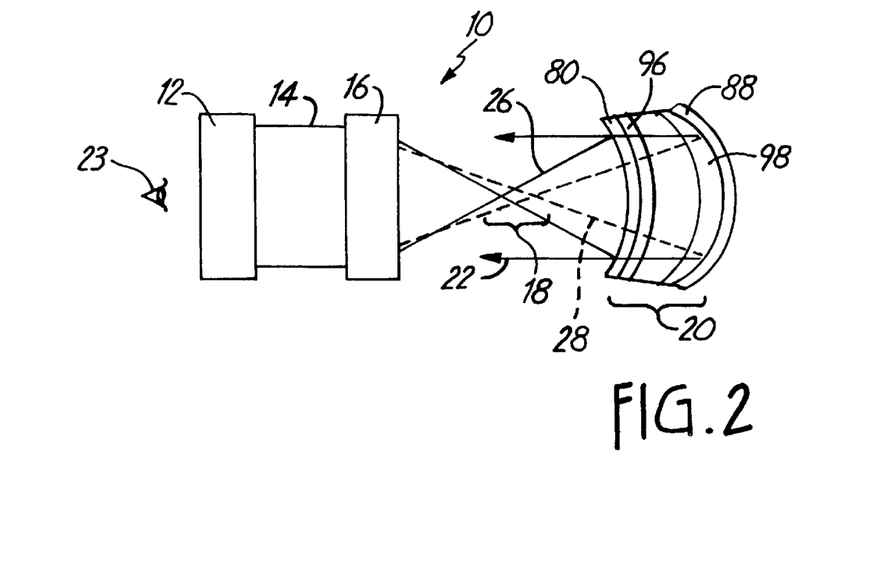
FIG. 2 is plan view of the display system of FIG. 1 with the relay lens shown in schematic diagram form and the combiner shown in enlarged detail.

FIGS. 1 and 2 show a multi-color optical head-up display ("HUD") system 10 in which the present invention is preferably implemented and which is preferably installed in an aircraft. System 10 includes an image source 12 that produces a multi-colored image carried by light rays 14 that propagate through a monochromatic relay lens 16 to create an intermediate image 18. Image 18 is carried by light rays 14 that are reflected by a collimating combiner 20 to create a final image 22 (FIG. 1) that is viewed at the pilot's eye reference point 23. Combiner 20 superimposes final virtual image 22 at or near optical infinity on an outside world scene (not shown) that the pilot sees through a windshield 24.

Image source 12 is preferably a cathode-ray tube that emits a multi-colored image that includes a green component 26 carried by multiple wavelengths of light in the range of about 540–560 nanometers (nm) and a red component 28 carried by multiple wavelengths of lights in the range of about 610–640 nm. (In other embodiments not shown, multi-colored image 14 could include a third, e.g., blue, component carried by multiple wavelengths of light in the range of about 470–500 nm.) Other colors of light may also be used. Image source 12 emits the color components of multi-colored image 14 in a conventional field sequential manner so that the color components are laterally color corrected as they propagate generally along a light path 32 (indicated by dash lines) toward relay lens 16.

Relay lens 16 transfers the image produced by image source 12 to combiner 20. Relay lens 16 preferably is a conventional monochromatic lens array configured to transfer a single color of light having a range of wavelengths centered at about 544 nm (i.e., green light) that is typically produced by a cathode-ray tube constructed with a P43 phosphor.

Monochromatic lens 16 includes between five and twelve, and typically nine, optical lens elements that cooperate to form a focused, single-color intermediate image. Lens elements 34, 36, 38, 40, 42, 44, 46, 48, and 50 each have specially configured curved surfaces and thicknesses that cooperate to bend the single-colored light as it propagates through relay lens 16. The radii of the curved surfaces and the thicknesses of the lens elements can be determined by a person sufficiently skilled to use a commercially available ray trace program such as the Code V or Oslo Six software analysis and design program. The multiple colors of light carried by green light rays 26 and red light rays 28 emitted by light source 12 propagate through monochromatic relay lens 16 and are bent along different light paths so that intermediate image 18 can be described as being unfocused and having longitudinal color aberrations.

Intermediate image 18 is reflected and refracted by collimating combiner 20 to create final virtual image 22 (FIG. 1) that has an image point approximately at infinity for each wavelength of light that the pilot views from eye reference point 23. To correct the longitudinal color aberrations of intermediate image 18, combiner 20 includes multiple substrates 80 and 88 and multiple wavelength selective reflective coatings 96 and 98, as described in U.S. Pat. No. 5,710,668.

Figure 3:
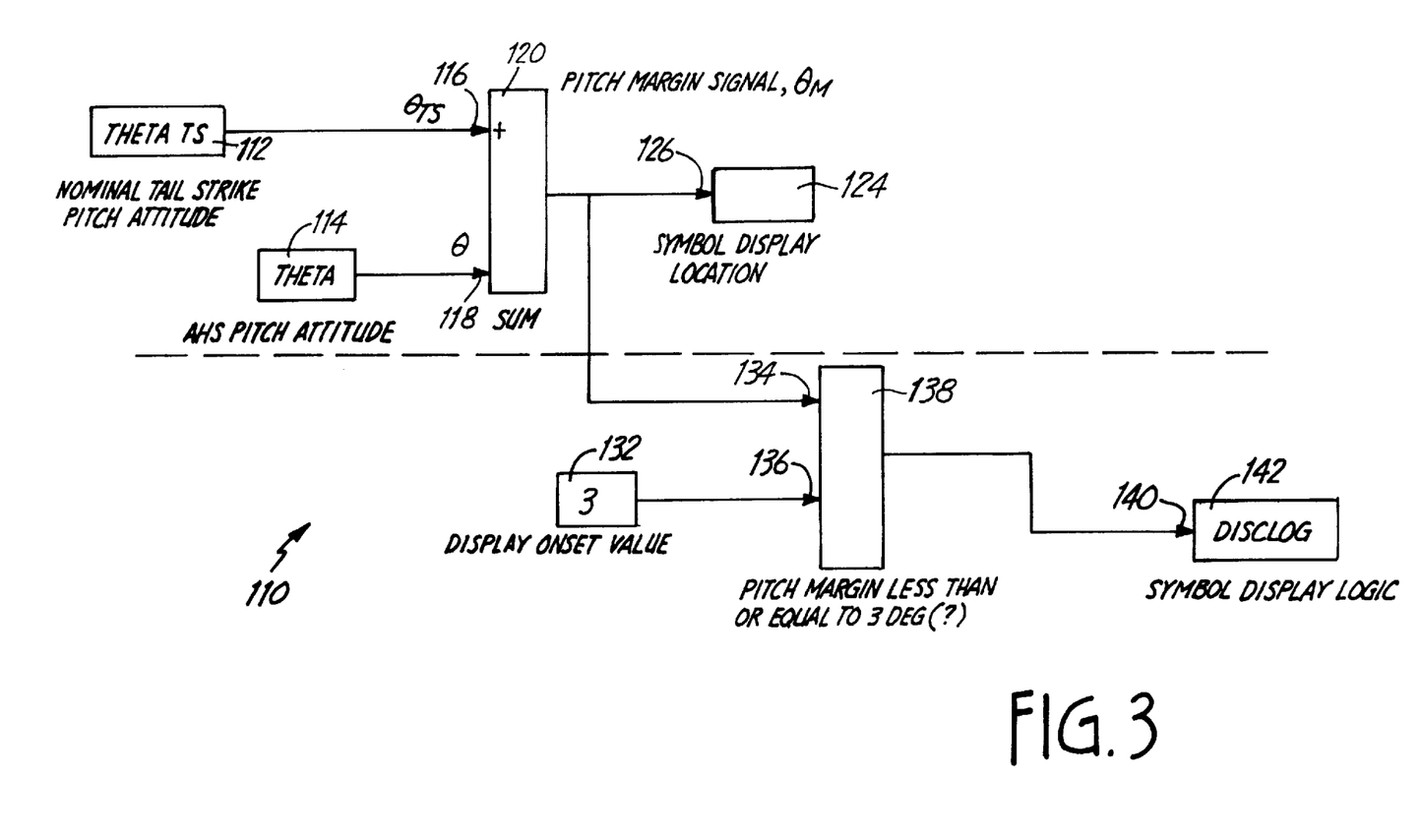
FIG. 3 is a block diagram of processing circuitry of a first embodiment that implements an aircraft tail strike warning calculation when adequate display surface area is available.

FIG. 3 is a block diagram of processing circuitry 110 representing a first embodiment of the invention that implements an aircraft tail strike warning calculation and display logic in an aircraft computer when adequate display surface area is available. A nominal tail strike pitch attitude signal, $\theta_{TS}$ preset in a memory site 112 represents a tail strike parameter that is a function of the aircraft wheel height, landing gear length, overall length, and rear end geometry of the particular aircraft in which processing circuitry 110 is installed. An actual pitch attitude signal, $\theta$, is provided by an attitude heading system (AHS) information source 114. An inertial reference system (IRS) and attitude heading reference system (AHRS) are two possible AHS sources for use in implementing the present invention. The outputs of memory site 112 and AHS source 114 are applied to, respectively, a noninverting input 116 and an inverting input 118 of an arithmetic unit 120, which provides at its output a pitch margin signal, $\theta_M$, that represents the difference, $\theta_{TS}-\theta$. The pitch margin signal, $\theta_M$, is used to determine whether and at what position a tail strike warning symbol is to be presented on combiner 20. A symbol display location module 124 receives at an input 126 the pitch margin signal, $\theta_M$, and, in response to its magnitude, determines the display surface positioning of appropriate tail strike warning symbology, depending on whether the aircraft is in a takeoff or approach to landing phase.

A display onset value (e.g., 3.0 degrees) previously stored in a memory site 132 establishes a threshold pitch margin against which the pitch margin signal, $\theta_M$, is compared to determine whether aircraft takeoff or approach to landing conditions warrant display of warning symbology. The pitch margin signal, $\theta_M$, and the output of memory site 132 are applied to respective inputs 134 and 136 of a comparator 138, which provides at its output a pitch margin display enable signal that appears whenever the pitch margin signal represents a pitch margin that equals or exceeds three degrees. The pitch margin display enable signal is applied to an input 140 of a symbol display logic module 142 and causes a display of tail strike warning symbology whenever the pitch margin equals or exceeds 3.0 degrees.

The broken horizontal line 144 appearing in FIG. 1 represents a dividing line between the calculation of the display screen position of tail strike warning symbology and a determination of whether flight conditions warrant a display of tail strike warning information.

Figure 4:
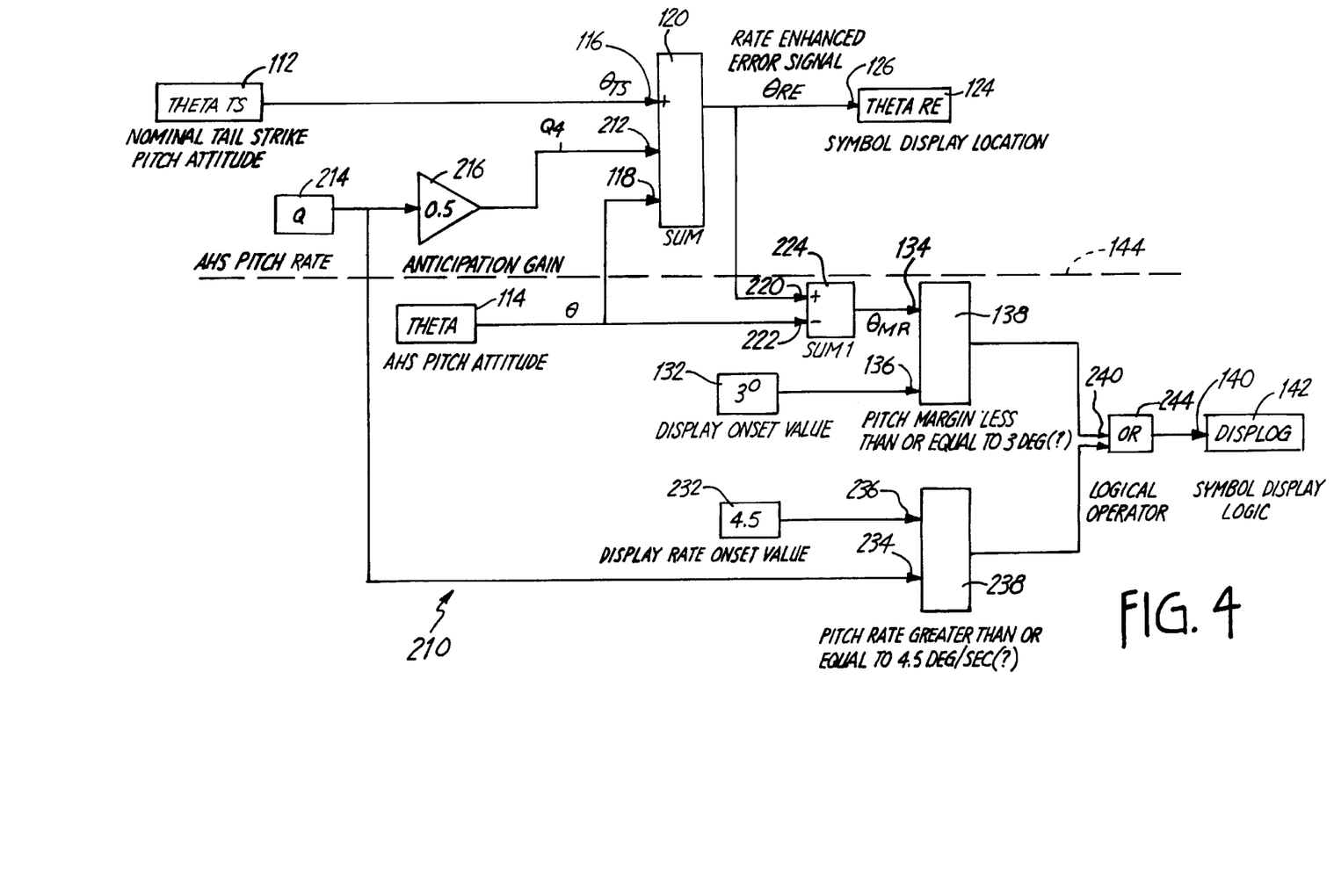
FIG. 4 is a block diagram of processing circuitry of a second embodiment that implements an aircraft tail strike warning calculation when inadequate display surface area is available, rapid aircraft rotation is required, or increased aircraft control anticipation is required.

FIG. 4 is a block diagram of processing circuitry 210 representing a second embodiment of the invention that implements an aircraft tail strike warning signal calculation and display logic in an aircraft computer when adequate display surface area is unavailable, rapid aircraft rotation is required, or increased control anticipation is required. The second embodiment factors into the calculation presented for the first embodiment a pitch attitude rate to produce a pitch rate enhanced error signal, $\theta_{RE}$, which is used to determine whether and at what position a tail strike warning symbol is to be presented on combiner 20. Processing circuitry 210 represents an enhancement of processing circuitry 110, both of which have common components designated by identical reference numerals.

Arithmetic unit 120 receives at an inverting input 212 a gain-multiplied pitch attitude rate signal, $Q_G$, provided by an AHS pitch attitude rate information source 214 and scaled by a fixed gain amplifier 216. The output provided by arithmetic unit 120 is a pitch rate enhanced error signal, $\theta_{RE}$, that represents the difference, $\theta_{TS}-(\theta+Q_G)$. Symbol display location module 124 receives at its input 126 the pitch rate enhanced error signal, $\theta_{RE}$, and, in response to its magnitude, determines the display surface positioning of the tail strike warning symbology depicted in FIGS. 5–7.

The decision whether to display aircraft tail strike warning symbology entails comparisons against a threshold pitch attitude margin, in a manner similar to that of the first embodiment, and against a threshold pitch attitude rate.

The pitch attitude margin comparison is carried out by applying pitch rate enhanced error signal, $\theta_{RE}$, and actual pitch attitude signal, $\theta$, to, respectively, a noninverting input 220 and an inverting input 222 of an arithmetic unit 224, which provides at its output a difference signal, $\theta_{MR}$, that represents the difference, $\theta_{RE}-\theta$. The difference signal, $\theta_{MR}$, is applied to input 134 of comparator 138 to carry-out the pitch margin comparison and provide a pitch margin display enable signal as described above for the first embodiment.

A display rate onset value previously stored in a memory site 232 establishes a threshold pitch attitude rate against which the pitch attitude rate signal, Q, provided by pitch attitude rate information source 214 is compared to determine whether aircraft takeoff or flight conditions warrant display of warning symbology. The pitch attitude rate signal, Q, and the output of memory site 232 are applied to respective inputs 234 and 236 of a comparator 238, which provides at its output a pitch attitude rate display enable signal that appears whenever the pitch attitude rate signal represents a pitch attitude rate that reaches or exceeds 4.5 degrees per second. The outputs of comparators 138 and 238 are applied to respective inputs 240 and 242 of an OR gate 244 to provide alternative display enable signals to input 140 of display logic module 142. The output of OR gate 244 provides display enable signals that cause a display of tail strike warning symbology whenever the pitch margin equals or exceeds 3.0 degrees or the pitch attitude rate equals or exceeds 4.5 degrees per second.

Figure 5:
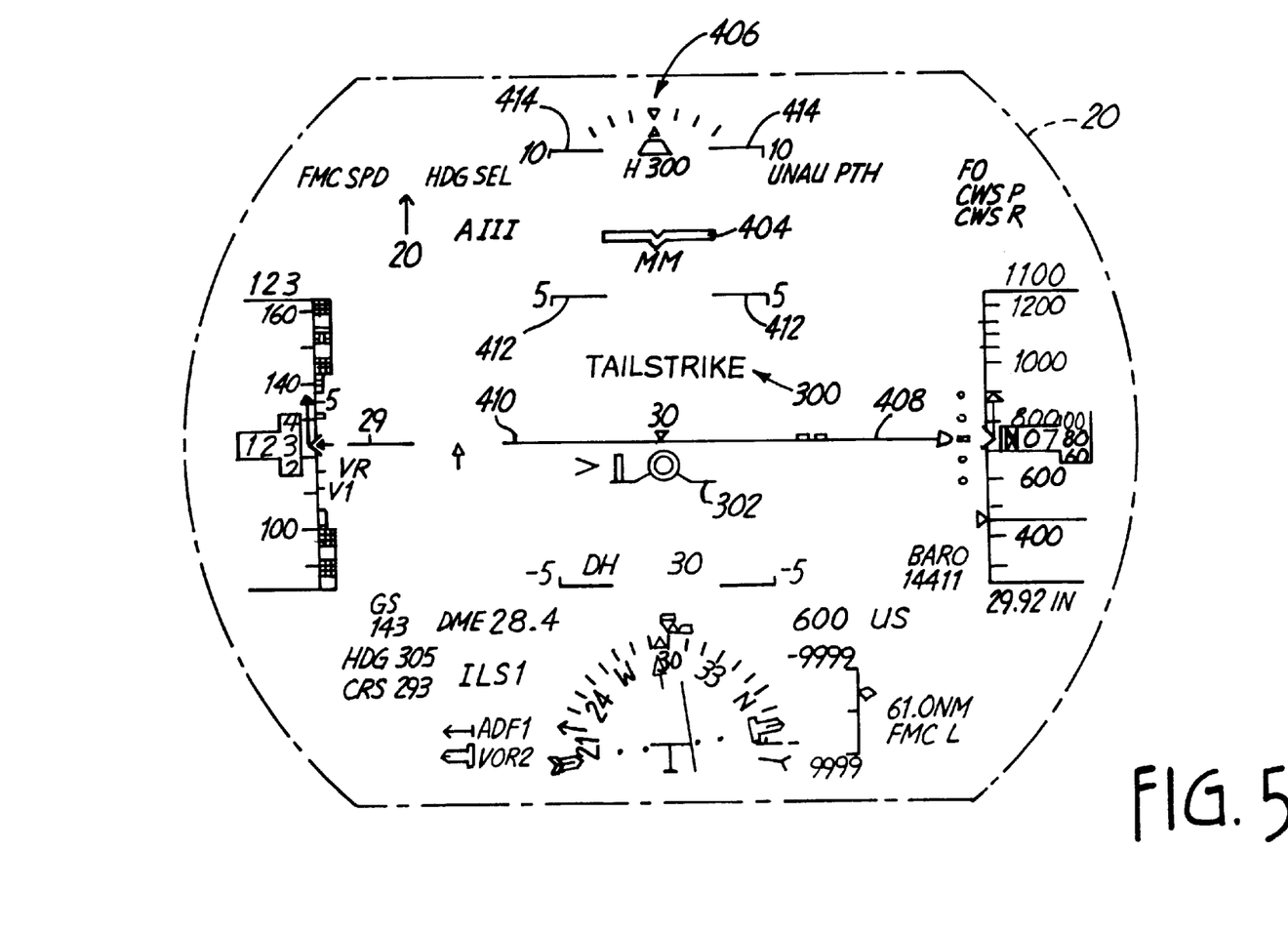
FIG. 5 shows a combiner displaying a tail strike warning annunciation when an aircraft is on approach to landing.

FIG. 5 shows combiner 20 displaying an exemplary TAILSTRIKE warning annunciation 300 when an aircraft is on approach to landing and symbol display logic module 142 is enabled in either the first or second embodiment. Symbol display location module 124 displays TAILSTRIKE annunciation 300 above a flight path symbol 302 on combiner 20. Flight path symbol 302 represents the instantaneous direction of the inertial velocity of the aircraft relative to its longitudinal axis. Positioning TAILSTRIKE warning annunciation 300 in proximity to flight path symbol 302 as a reference is intuitively appropriate because the attention of the pilot using a head-up display is centered about the flight path symbol during approach to landing. An altimeter reading indicating aircraft altitude above about 30 meters causes suppression of TAILSTRIKE annunciation 300 by symbol display logic module 142.

Figures 6, 7:
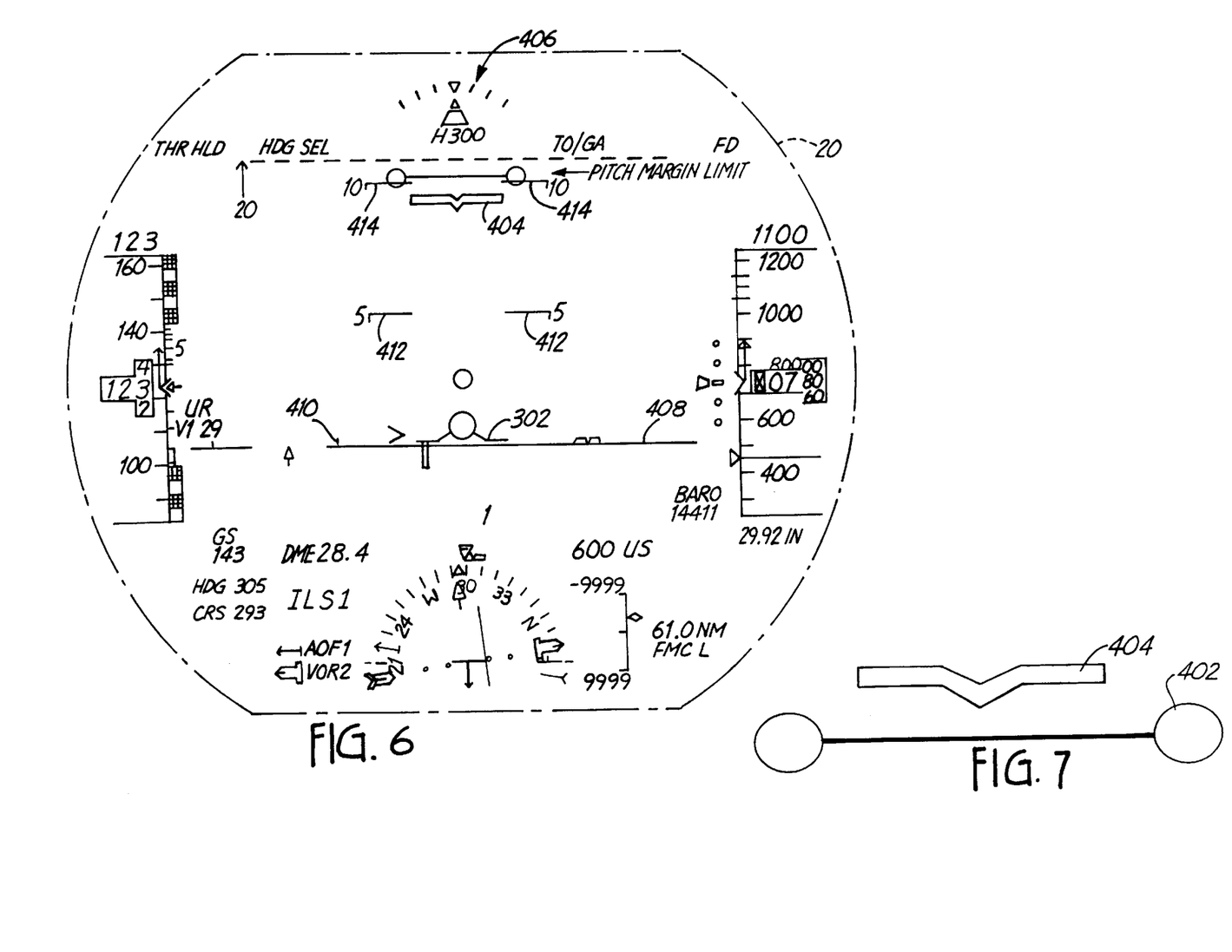
FIG. 6 shows a combiner displaying tail strike warning symbology when the aircraft is undergoing take-off.
FIG. 7 shows the positional relationship of a pitch margin limit (PML) symbol and boresight reference symbol indicating an imminent tail strike incident.

FIG. 6 shows combiner 20 displaying exemplary tail strike warning symbology when the aircraft is undergoing takeoff and symbol display logic module 142 is enabled by the display enable signal of the first embodiment or either of the alternative display enable signals of the second embodiment. Symbol display location module 124 positions a pitch margin limit (PML) symbol 402 relative to a stationary aircraft or "boresight" reference symbol 404. The PML symbol 402 is in the form of a barbell and assumes a position on combiner 20 in response to the pitch margin signal $\theta_M$, in the first embodiment or the pitch rate enhanced error signal, $\theta_{RE}$, in the second embodiment. Boresight reference symbol 404 represents the projected longitudinal centerline of the aircraft.

During aircraft rotation in a takeoff scenario in either normal or low visibility conditions, the attention of a pilot using a head-up display is on pitch attitude (ascertained with reference to boresight symbol 404) to ensure achievement of a proper aircraft rotation pitch angle. An altimeter reading indicating climb of the aircraft through about three meters causes suppression of PML symbol 402 by symbol display logic module 142.

FIG. 6 shows several symbology sets located near boresight symbol 404 and the expected range of positions of PML symbol 402. A roll scale and pointer symbol set 406 appears near the top of combiner 20, and a horizon line 408 with a vertical compass location marker 410 appears just below the center of combiner 20. Vertically spaced-apart horizontal line segments with bent lateral ends 412 and 414 represent respective five degree and 10 degree pitch attitude or "ladder" marks that move vertically together with horizon line 408 relative to boresight symbol 404 in response to the aircraft pitch attitude. The presence of roll scale and pointer symbol set 406 at the top of combiner 20 and boresight symbol 404 near the top of combiner 20 sets upper and lower boundaries between which PML symbol 402 can move vertically. Factoring pitch attitude rate in the tail strike warning calculation facilitates the use of a confined display space to indicate movable tail strike warning symbology over a useful dynamic range of pitch margins.

FIG. 7 shows the positional relationship of PML symbol 402 and boresight reference symbol 404 indicating an imminent tail strike incident. Symbol display logic module 124 is configured to indicate a pitch attitude margin as long as PML symbol 402 is positioned above boresight symbol 404 in response to the pitch rate margin signal $\theta_M$, or the pitch enhanced error signal, $\theta_{RE}$. The pilot's objective is, therefore, to not allow PML symbol 402 to descend below boresight symbol 404 during aircraft rotation. The reason is that during aircraft rotation boresight symbol 404 is initially positioned an appreciable distance below PML symbol 402, which converges toward boresight symbol 402 as the pitch margin decreases. Since the pilot recognizes PML 402 as a limit, the pilot would naturally not permit boresight symbol 404 to reach or exceed the pitch margin limit.

Figure 8:
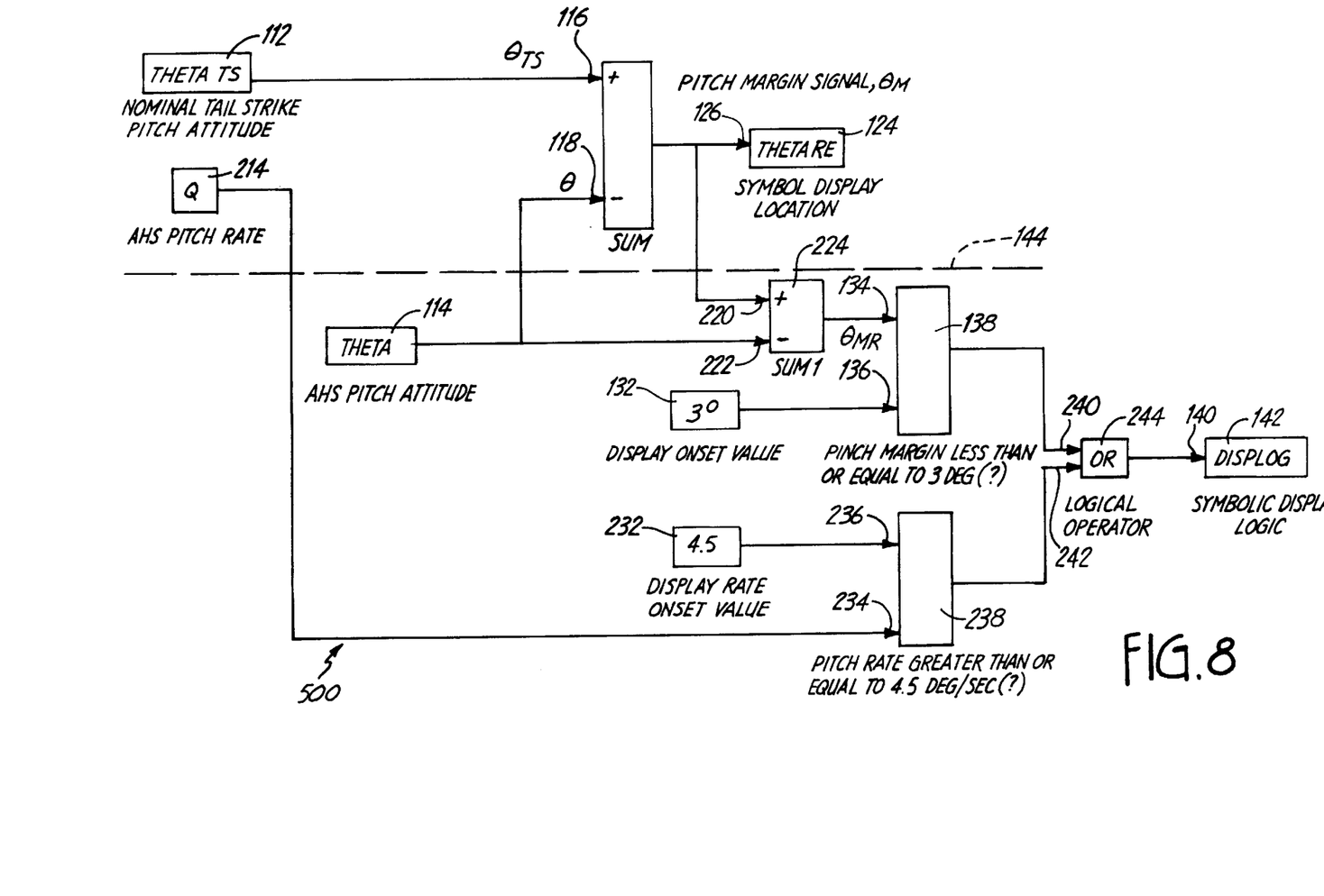
FIGS. 8 and 9 are block diagrams of alternative processing circuitry that incorporate combinations of the display symbol location calculations and display symbol presentation determinations implemented in the first and second embodiments of FIGS. 3 and 4.
Figure 9:
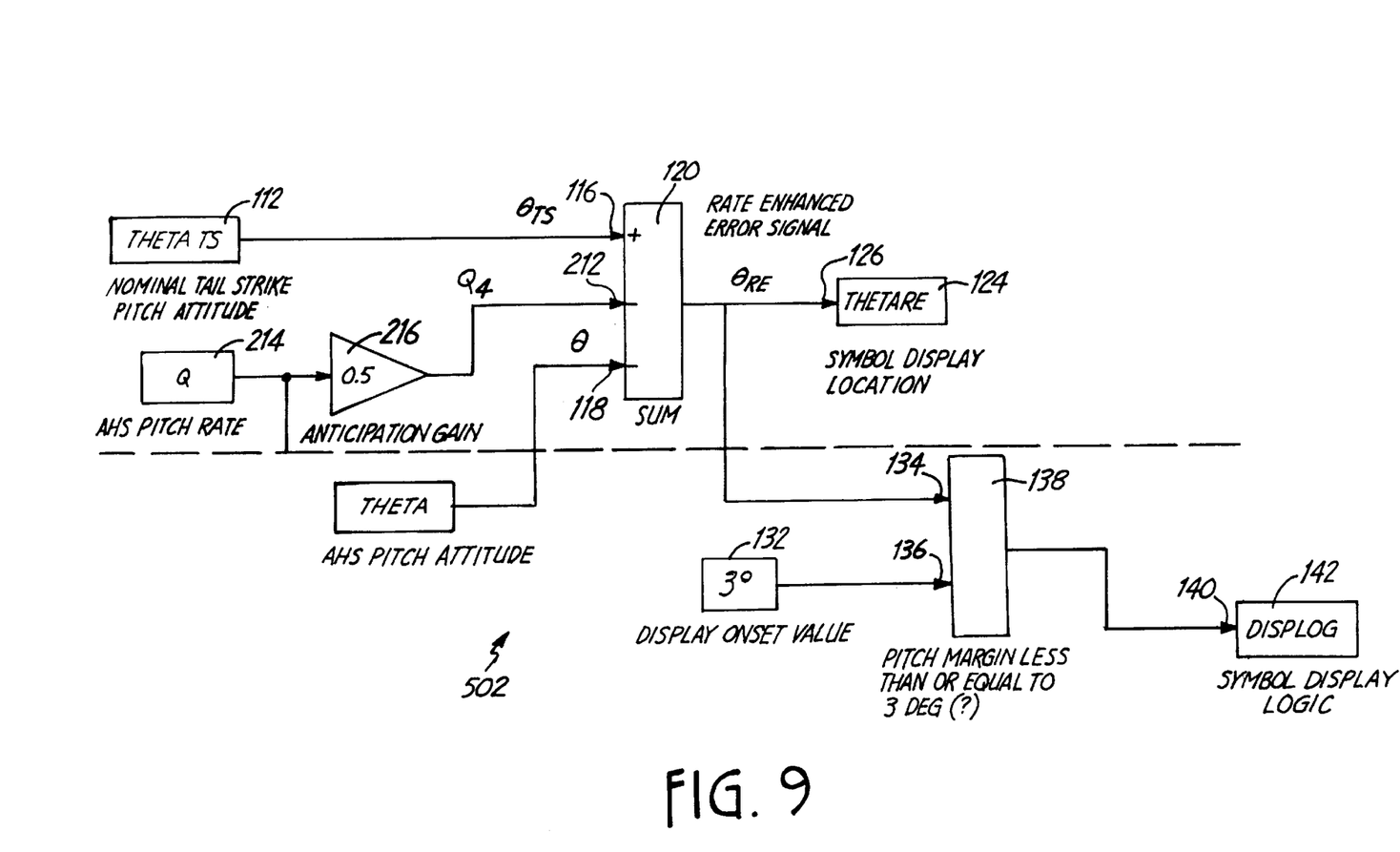

FIGS. 8 and 9 are block diagrams of alternative processing circuitry that incorporate combinations of the display symbol location calculations and display symbol presentation determinations implemented in the first and second embodiments. In particular, FIG. 8 represents processing circuitry 500 that implements the display symbol location calculations without factoring AHS pitch rate (as in the first embodiment of FIG. 3) but implements the display symbol presentation determinations factoring AHS pitch rate (as in the second embodiment of FIG. 4). FIG. 9 represents processing circuitry 502 that implements the display symbol location calculations factoring AHS pitch rate (as in the second embodiment of FIG. 4) but implements the display symbol presentation determinations without separately factoring AHS pitch rate (as in the first embodiment of FIG. 3). These alternatives would be useful implementations in any aircraft type for which increased control anticipation is required.

It will be obvious to those having skill in the art that many changes may be made to the details of the above-described embodiments of this invention without departing from the underlying principles thereof. For example, the tail strike symbology can be presented advantageously on head-down display systems. The scope of the present invention should, therefore, be determined only by the following claims.

What is claimed is:

1. In an aircraft optical display system that produces images for observation by a pilot, the display system including an image source providing an image carried by light propagating along an optical path and an optical display surface positioned so as to provide an image for observation by the pilot, a method of providing for display on the display surface aircraft tail strike warning symbology that alerts the pilot to a possible impending incident in which the aircraft tail strikes the ground as the aircraft moves, comprising:

providing a nominal aircraft tail strike pitch attitude parameter established by aircraft-specific dimension criteria;

deriving actual aircraft pitch attitude information, the actual aircraft pitch information derived from aircraft pitch attitude sensor information;

offsetting the nominal aircraft tail strike pitch attitude parameter by the actual aircraft pitch attitude information to produce an aircraft margin signal; and producing for display aircraft tail strike warning symbology whenever a signal corresponding to the aircraft pitch margin signal is not within a preassigned operational tolerance.

2. The method of claim 1 in which the aircraft-specific dimension criteria include aircraft length and aircraft wheel height and landing gear length.

3. The method of claim 1, further comprising offsetting the nominal aircraft tail strike attitude parameter by aircraft pitch anticipation information to produce an aircraft pitch rate enhanced error signal.

4. The method of claim 3 in which the derivation of the aircraft pitch anticipation information includes applying a predetermined gain factor to pitch rate sensor information provided by an aircraft attitude information source.

5. The method of claim 3 in which the offsetting of the nominal aircraft tail strike pitch attitude parameter includes subtracting the aircraft pitch anticipation and actual aircraft pitch attitude information from the nominal aircraft tail strike pitch attitude parameter.

6. The method of claim 3 in which a signal corresponding to the aircraft pitch rate enhanced error signal is produced by subtracting a signal representing pitch attitude information from the aircraft pitch rate enhanced error signal.

7. The method of claim 3 further comprising determining a comparative relationship between a predetermined maximum display onset value and a predetermined maximum aircraft pitch rate to cause the display of aircraft tail strike warning symbology.

8. The method of claim 1 in which a comparative relationship between a predetermined minimum display onset value and a signal corresponding to the aircraft pitch margin signal produces a pitch margin that is outside of the predetermined operational tolerance to cause the display of aircraft tail strike warning symbology.

9. The method of claim 1 in which the display of aircraft tail strike warning symbology is suppressed above a first predetermined aircraft altitude during aircraft takeoff and above a second predetermined aircraft altitude during aircraft approach to landing.

10. The method of claim 9 in which the aircraft is specified in part by a projected longitudinal centerline; the display presents a boresight reference symbol that indicates the projected longitudinal centerline of the aircraft; and, upon aircraft takeoff, the aircraft tail strike warning symbology is presented in visual proximity to the boresight reference symbol.

11. The method of claim 10 in which the tail strike warning symbology is presented in a form of an aircraft pitch margin limit image representation in relative positional relationship with the boresight reference symbol.

12. The method of claim 9 in which the aircraft has an instantaneous direction of inertial velocity and is specified in part by a longitudinal axis; the display presents a flight path symbol that indicates the instantaneous direction of the inertial velocity of the aircraft relative to its longitudinal axis; and, upon aircraft approach to landing, the aircraft tail strike warning symbology is presented in visual proximity to the flight path symbol.

13. The method of claim 12 in which the tail strike warning symbology is presented in word annunciation form in proximal position to the flight path symbol.

14. The method of claim 1 in which the optical display system produces images for observation in combination with the pilot's exterior view of an outside world scene, and in which the optical display surface comprises an optical combiner so that the pilot can see the exterior view through it and so that at least some of the light reflects off of the combiner to provide the image for observation by the pilot.

* * * * *